United States Patent [19]
Hvilsted et al.

[11] Patent Number: 5,496,670
[45] Date of Patent: Mar. 5, 1996

[54] OPTICAL STORAGE MEDIUM

[75] Inventors: Søren Hvilsted, Hørsholm; P. S. Ramanujam, Roskilde, both of Denmark; Fulvio Andruzzi, Pisa, Italy

[73] Assignees: Risø National Laboratory, Roskilde, Denmark; Consiglio Nazionale della Richerche, Rome, Italy

[21] Appl. No.: 113,303

[22] Filed: Aug. 30, 1993

[51] Int. Cl.$^6$ .................................................. G03G 15/00
[52] U.S. Cl. .......................... 430/56; 528/185; 528/210; 528/272; 528/288; 528/289; 528/291; 430/20; 430/322; 430/363; 430/945
[58] Field of Search ..................... 528/272, 288, 528/289, 291, 185, 210; 430/20, 56, 322, 363, 945

[56] References Cited

PUBLICATIONS

Eich et al., J. Opt. Soc. Am. B/vol. 7, No. 8, pp. 1428–1436 (Aug. 1990).
Gibbons et al., Nature, vol. 351, pp. 49–50 (May 2, 1991).
Chen et al., Optics Letters, vol. 17, No. 6, pp. 441–443 (Mar. 15, 1992).
Rochon et al., Appl. Phys. Lett. 60, (1) pp. 4–5 (1992).
Natansohn et al., Macromolecules 25, 2268–2273 (1992).
Natansohn et al., Macromolecules 25, 5531–5532 (1992).
Xie et al., Chem. Mater. 5, 403–411 (1993).

*Primary Examiner*—Samuel A. Acquah
*Attorney, Agent, or Firm*—Birch, Stewart, Kolasch & Birch

[57] ABSTRACT

A macroscopically isotropic side chain liquid crystal polymer is described containing photochromic mesogenic groups and which through irradiation with light is capable of being permanently or substantially permanently converted into an optically anisotropic phase without having been pre-oriented. The polymer is preferably a polyester between on the one hand either an aliphatic, optionally substituted, α,ω-dicarboxylic acid having a total chain length of up to 24 carbon atoms, or an aryl-, in particular phenyl-, carboxylic acid, and on the other hand an optionally substituted 1,3-propanediol containing the mesogenic group, or a group containing the mesogenic group, attached to the carbon in the 2-position. Furthermore, an optical storage device comprising a film of the polymer.

43 Claims, 5 Drawing Sheets

OPTICAL STORAGE MEDIUM

The present invention concerns a novel material suited for optical storage of both analog information, typically in the form of holograms, and binary information in the form of bits.

The optical storage medium offered by the present invention will offer a high data density while at the same time permitting a simple manufacturing process, a long life time of the stored data, and an independence of the type of data to be stored. The data density obtained by the present invention is fully comparable to that obtainable in the currently available storage media.

At present, optical memories have been based on magneto-optical rotation in thin films or thermal phase changes that are due to local heating generated by a focused laser beam. However, there are not many concepts available for an erasable and re-writable optical memory.

The known art in the area of optical storage has for a number of years concerned the investigation of the optical properties of liquid-crystal polymers. Eich and Wendorff (J. Opt. Soc. Am. B 7, 1428 (1990)) have demonstrated optical storage in a side-chain liquid-crystalline polymer containing cyanoazobenzene moieties and pre-aligned by being sandwiched between two glass plates coated with buffed polyimide. Gibbons et al. (Nature 351, 49 (1991)) have used an alignment layer that is a mixture of polyimide and an azo dye. Recently Chen and Brady (Opt. Lett. 17, 441 (1991)) have recorded real-time holograms with low threshold intensity in azo-dye molecules in a nematic liquid-crystal host. However, all these systems require prealignment of the liquid crystal polymer. Such prealignment procedures may not be desirable in commercial storage devices as they tend to increase the complexity of the fabrication processes, which lead to increased chances of failure of the final product. Furthermore, all the liquid-crystalline polymers studied so far appear to be of relatively low molecular mass, which results in poor mechanical properties. The present invention concerns a new side-chain liquid-crystalline polyester system, which is simple to cast and which does not require any prealignment. These films have good mechanical properties and can be made in the form of free self-supporting films.

The present invention concerns a macroscopically isotropic side chain liquid crystal polymer containing photochromic mesogenic groups and which, without having been pre-oriented, through irradiation with light is capable of being permanently or substantially permanently converted into an optically anisotropic phase.

In the present context, a macroscopically isotropic polymer is a polymer being optically isotropic over a macroscopic scale, this scale being on the order of 1 μm. The anisotropic phase is defined by having different optical properties than the isotropic phase. These optical properties may be the refractive index, the absorption, the thickness, or other properties giving altering optical properties of the polymer.

A side chain liquid crystal polymer is typically a polymer containing side chains in which the side chains exhibit liquid crystalline properties.

In the present context, the term "mesogenic group" is in accordance with common terminology within the field of liquid crystals intended to mean a terminally located, generally rod-shaped and rigid moiety.

In the present context, the term "photochromic" is intended to mean that the group in question absorbs light at wavelengths in the range of 100–1600 nm, in particular 300–700 nm and which as a result of light absorbtion is able to undergo a reversible conformational change.

Conventionally, liquid crystal polymers are aligned by depositing them on a substrate coated with a polyimide layer which has been rubbed in one direction. Thus, the surface of the polyimide substrate is macroscopically modified enabling liquid crystals to align uni-directionally on the surface thereof. When prealignment of the polymers may be omitted, the fabrication process of a storage device will be simpler and, thus, the final product will be cheaper.

It is preferred that the polymer contains photochromic mesogenic groups having a dipole moment either in the ground state and/or in the excited state, that the polymer is illuminated with polarized light, and that the conversion into the optically anisotropic phase comprises rotation of the axis of the dipoles away from the isotropic distribution of the directions of the dipoles towards a state in which the axis of the dipoles are substantially aligned at a certain angle to the polarization of the irradiating light.

This is preferred as it is possible to affect a dipole moment with the electric field of light. The direction of the electrical field of light defines the direction of the polarization of the light. The probability that a dipole moment interacts with a photon is proportional to the square of the cosine to the angle between the dipole moment and the electric field of the illuminating light.

An example of this effect will be described in the following, where the mesogenic group of the polymer contains an azo function and also contains the dipole moment. The isotropic phase of the polymer is a phase in which the dipole moments of the polymer are randomly oriented.

Without being limited to any theory, it is contemplated that the degree of rotation of the chromophores containing the azo-compound is a function of the intensity of the illumination and of the length of the illumination period. When illuminated, the chromophore transfers from a trans-state to a cis-state in the azo function, whereafter the chromophore decays to the trans-state. During this period of time, the illuminating light will have affected the dipole so as to give rise to a small rotation of the dipole moment, and thus of the chromophore. As long as the chromophores have a component of the dipole moment in the direction of the polarization of the incident light, the dipole moments will be able to interact with the light. However, when the dipole moment in the trans-state lies perpendicular to the polarization of the light, no interaction will take place. Thus, when at least a significant part of the chromophores are aligned in this direction, the anisotropic phase is obtained. This orientation of the dipole moments induces a reorientation of the chromophores and probably also of the main chain, and the alignment of the main chain is frozen even after the polarized light is removed.

Polarized light may be obtained by either using a laser light source or by transmitting light from e.g. a lamp through a polarizer.

To be able to form e.g. a hologram in the polymer, it is preferred that the photochromic mesogenic groups in the polymer are present in a concentration corresponding to an absorbance between 0.001 and 10 at the wavelength used to irradiate the polymer so as to on the one hand give a sufficiently strong signal and on the other hand be able to transmit a sufficient amount of light through the polymer. It is particularly preferred that the photochromic mesogenic groups in the polymer are present in a concentration corresponding to an absorbance between 0.01 and 5, such as between 0.1 and 3, or even more preferred between 0.5 and 2, such as about 1, at the wavelength used to irradiate the polymer.

The absorbance of the polymer depends on both the thickness of the polymer film and on the concentration of the chromophores in the polymer. Thus, a thicker film may be used if the concentration of the chromophores in the polymer is sufficiently small.

It is especially preferred that the polymer be a polyester on account of the mechanical properties of polyesters. Polyesters are characterized by a high mechanical strength and elasticity. These properties are desirable in order to obtain optical storage means for long-time storage of information and for the production of free-standing films.

Furthermore, as the optical storage medium is suited for almost all types of information, it will be preferred to be able to use less power-consuming and more compact light emitters such as light diodes, laser diodes, lamps, or low-power gas lasers. The wavelength of these light emitters is presently typically in the area of 500–2000 nm and having a power of from several milliwatts to several watts. However, an intensive research is taking place to manufacture compact lasers emitting light at lower wavelengths, such as 430 nm.

The polymer is preferably one which is capable of being permanently or substantially permanently converted into an optically anisotropic phase by irradiation with light of a single wavelength in the range of 100–1600 nm.

In order to obtain convenient writing of information without excessive use of time or energy, it is preferred that the irradiation is performed with light at 300–700 nm with an energy between 1 mJ/cm$^2$ and 10 J/cm$^2$ for a period of time of less than 1000 seconds or more specifically, it is preferred that the irradiation is performed with light at 300–550 nm with an energy between 50 mJ/cm$^2$ and 1 J/cm$^2$ for a period of time of less than 50 seconds, or even more specifically that the irradiation is performed with light at 350–515, such as energy of about 100 mJ/cm$^2$ for a period of time of less than 10 seconds, such as less than 1 second, preferably less than 0.5 seconds.

In a first aspect, for ease of writing with the available laser sources, it is preferred that the polymer is capable of being permanently or substantially permanently converted into an optically anisotropic phase by irradiation with light of a single wavelength in the range of 100–1600 nm, such as in the range of 300–700 nm, preferably in the range of 330–515 nm, such as in the range of 350–515 nm, e.g. 488 nm or 514 nm, as emitted by an Argon-ion laser.

Naturally, all of the types of light sources emitting light in the above range, such as excimer lasers, frequency doubled YAG lasers, Kr-lasers, diode lasers, and synchrotron sources may be used for the purpose of writing information in the polymer.

This type of information is typically either a hologram stored over at least a large part of the surface of the polymer. The area used to store the hologram may be reduced by e.g. using an aperture to define this area. Furthermore, binary information may be stored e.g. as bits by a focussed laser.

In order to facilitate storage of information using low-energy light sources, which is desirable if the storage is to be performed by domestic users, it is preferred that storage of information may be obtained by applying light to the polymer at an energy between 1 mJ/cm$^2$ and 10 J/cm$^2$ when the polymer is in the form of a film of a thickness in a range between 0.5 and 1000 μm. It is specifically preferred that the light is applied to the polymer at an energy between 50 mJ/cm$^2$ and 1 J/cm$^2$ when the polymer is in the form of a film of a thickness in a range between 0.5 and 100 μm.

To enable storage of information using eye-safe light sources, it is preferred that the light is applied to the polymer at an energy of between 100 mJ/cm$^2$ and 800 mJ/cm$^2$ when the polymer is in the form of a film of a thickness in a range between 1 and 10 μm, such as light at an energy of about 500 mJ/cm$^2$ when the polymer is in the form of a film with a thickness of about 5 μm.

Even though it is presently preferred to use thin films (1–10 μm) for storage of information, thicker, free-standing films may be manufactured by lowering the concentration of the photochromes in the polyesters, such as e.g. in the manufacture of volume holograms.

In a second aspect of the invention, polymers may be manufactured which are capable of being permanently or substantially permanently converted into an optically anisotropic phase by first irradiating the polymer with polarized light of a first wavelength in the range of 100–1600 nm and simultaneously or subsequently irradiating the polymer with polarized light of a second wavelength in the range of 100–1600 nm.

Thus, as two light beams are required for the permanent or substantially permanent storage of the information, the information may be "gated" in the sense that the information is only permanently or substantially permanently stored in the area of the polymer, which is illuminated by both light beams. Thus, in the case of holographic storage, even though the information is present over the entire polymer film, it is possible to store the information only in a small area defined by the cross section of the second light beam.

In the prior art, bi-photon processes have been seen. However, these systems require illumination with either an incoherent high-intensity UV-pump (1 W/cm$^2$), such as a Hg-lamp, or a high-power visible light laser (100–1000 W/cm$^2$) simultaneous with a near-infrared laser. Of course, these types of high power light emitters are preferably avoided due to the requirements of power, cooling water, shielding a.s.o. This should be compared to the films of the present invention, wherein the intensity requirements are much easier met. Furthermore, the simultaneous illumination of the film with the two light beams is no longer required.

Initially, the dipole moments in the polymer are aligned in the plane of the polymer film. But after illumination with the light of the first wavelength in a period of time, at intensities e.g. between 20 and 200 mW/cm$^2$, the film becomes transparent and loses its birefringence when examined between crossed polarizers. Without being limited to any theory, it is contemplated that the illuminated chromophores containing the dipole moments are locked in an isotropic cis-state due to the illumination with the light of the first wavelength. When the chromophores are in this state, illumination with light of the second wavelength is able to fix the holographic information in the polyester film, whereby the film acquires a birefringence due to the light beam of the second wavelength aligning the dipoles at a certain angle to its direction of polarization.

To enable the use of suitable light emitters, it is preferred that the first wavelength is in the range of 300–700 nm, the second wavelength is in the range of 400–800 nm, the light of the first wavelength illuminates the polymer for between 0.01 and 1000 seconds with an intensity of between 1 mJ/cm$^2$ and 10 J/cm$^2$, and that the light of the second wavelength illuminates the polymer for between 0.01 seconds and 100 hours with an intensity of between 1 mJ/cm$^2$ and 10 J/cm$^2$.

It is even more preferred that the first wavelength is in the range of 450–515 nm, the second wavelength is in the range of 600–700 nm, the light of the first wavelength illuminates the polymer for between 0.1 and 100 seconds with an intensity of between 50 mJ/cm$^2$ and 1 J/cm$^2$, and that the light of the second wavelength illuminates the polymer for between 0.1 and 1000 seconds with an intensity of between 50 mJ/cm$^2$ and 1 J/cm$^2$.

It is typically an advantage to irradiate the polymer with a second wavelength being different from the first wavelength. In this case, accidental overwriting of the existing information with the light of the second wavelength used for reading the information is prevented.

Thus, it is presently especially preferred that the first wavelength is about 488 nm or 514 nm as emitted from an Argon-ion laser, that the second wavelength is about 633 nm as emitted by a Helium-Neon laser or 670 nm as emitted by a diode laser, and that the intensities of the light of the first and second wavelengths are about 100 mJ/cm$^2$.

Generally, it is preferred that the anisotropic phase is characterized by a change in refractive index. In this case, the major part of the incident light is transmitted through the medium increasing the signal-to-noise-ratio of the detection of the information.

Typically, the change in refractive index is in excess of 0.1%, such as 0.5%, preferably 1%, such as 5%, preferably 10%, such as 30%, of the refractive index of the polymer in the isotropic state. In general, large modulations in the refractive index of the material lead to higher diffraction efficiencies and, thus, a better signal-to-noise ratio in the detection of the information.

One way of erasing the information stored in the polymer is to re-convert it to its isotropic phase by heating the polymer to a temperature of at least 60° C. and subsequent cooling to ambient temperature. In this way, the polymer is heated above the clearing temperature after which the chromophores are oriented randomly. This method will typically globally erase all information stored in the polymer. Naturally, this increase in temperature may be obtained by illumination with light, micro waves, electrical heating (e.g. by depositing the polymer on a substrate coated with a layer of Indium Tin Oxide (ITO), through which a suitable electric current is transmitted), exposing the film to hot air a.s.o.

Another way of erasing the information is by irradiating the polymer with light having a different polarization than that of the light carrying out the conversion of the isotropic phase to the anisotropic phase, or circularly polarized light. In the case of erasing the information by using light having a different polarization than that of the light carrying out the conversion of the isotropic phase to the anisotropic phase, the chromophores are directed relative to this new polarization. As the polarization of circularly polarized light rotates, the resulting directions of the individual chromophores will be random. This method, in contrast to the heating of the polymers, offers the possibility of local erasure of information stored in only a small area of the polymer.

The polymer according to the invention is able to store information at a density (expressed in lines per unit of length) of up to 5000 lines per mm and even up to 6000 lines per mm when a grating is formed in the polymer by two counter-propagating coherent beams.

Typically, it is preferred to irradiate the polymer with linearly or circularly polarized light, in particular linearly polarized light.

It is furthermore convenient and preferred to irradiate the polymer with monochromatic light, such as coherent light, especially laser light, especially for holographic storage.

Apart from general storage of binary or analog information, the optical storage of the type disclosed herein may also be used for a number of applications, such as in optical computing, optical neural networks, Optical Fourier Transform application, such as correlation and convolution.

Thus, using this optical storage means offers the manufacture of cheap, efficient storage modules. In one aspect the storage film may be manufactured with a suitable thickness so that the film does not require a substrate but is able to hold it self. In this way, the storage medium may be manufactured as a typical polyester and simply cut into suitable pieces, which may at once act as optical storages.

The shape of the optical storage medium may be chosen dependent on a number of situations and requirements. The storage medium may be round so that the reading of the data may be performed quite like usual CD's: a motor or the like turning the disk and a movable laser and detector reading the data.

If desired, the storage means may have other shapes: e.g. squared so that it forms a matrix, the individual cells of which may be addressed by either moving the storage means itself or the laser/detector in relation to the storage means.

The macroscopically isotropic side chain liquid crystal polymer of the invention exhibiting the novel property of not requiring prealignment is preferably a polyester between on the one hand either an aliphatic, optionally substituted, α,ω dicarboxylic acid having a total chain length of up to 24 carbon atoms, or an aryl-, in particular phenyl-, dicarboxylic acid, and on the other hand an optionally substituted 1,3-propandiol containing the mesogenic group or a group containing the mesogenic group attached to the carbon atom in the 2-position. Specifically, the polymer preferably has the general formula I

I in which

R is hydrogen or deuterium;

p is an integer in the range from 10 to 150;

x is 0 or is an integer in the range 1–140 with the proviso that x is less than p;

Y is selected from a group $Y^1$ of the formula $Y^1$ in which n is an integer in the range 0–22, a group of the formula $Y^2$ $Y^2$ in which m and m' is an integer in the range 0–18 with the proviso that m+m'≦18, a group of the formula $Y^3$ $Y^3$ in which $R^1$ and $R^2$ independently is hydrogen or halogen or $R^1$ and $R^2$ together form =O, and s and s' is an integer in the range 0–19 with the proviso that s+s'≦19, a group of the formula $Y^4$ $Y^4$ in which q is an integer 0, 5 or 6 and q' is an integer 1, 2 or 4, a group of the formula $Y^5$ $$-CD_2-(CH_2)_r-CD_2- \quad\quad Y^5$$

in which r is an integer in the range 0–20,
a group of the formula $Y^6$ $$-(CH_2)_{t'}-CD_2-(CH_2)_t-CD_2-(CH_2)_{t'}- \quad\quad Y^6$$

in which t is an integer 5 or 6 and t' is an integer in the range 0–10, or
a group of the formula $Y^7$ $$-(CH_2)_u-Z-(CH_2)_u- \quad\quad Y^7$$

in which u is an integer 0 or 1, and Z is selected from 1,2-, 1,3- or 1,4-phenylene;
X is a bond or is a group of the formula $$-(W)_w-(W')_{w'}-(W'')_{w''}-$$

wherein W, W' and W" independently is $CH_2$ or $CD_2$, w and w" is an integer 0 or 1, and w' is an integer in the range 0–10;
M is a mesogenic, photochromic group; and
A is a group of the formula II, III, IV or V $$-C(=O)-Y'-C(=O)-O-C(R)_2-C(R^3)_2-C(R)_2-O- \quad\quad (II)$$

$$-C(=O)-(CH_2)_v-Z'-(CH_2)_v-C(=O)-O-C(R')_2-C(R^3)_2-C(R)_2-O- \quad\quad (III)$$

$$-C(=O)-Y'-C(=O)-O-C(R)_2-\underset{\underset{M}{\overset{|}{X}}}{CH}-C(R)_2-O- \quad\quad (IV)$$

$$-C(=O)-(CH_2)_v-Z'-(CH_2)_v-C(=O)-O-C(R)_2-\underset{\underset{M}{\overset{|}{X}}}{CH}-C(R)_2-O- \quad\quad (V)$$

in which Y' is one of the groups $Y^1$–$Y^7$ defined above, Z' is as Z defined above, R is hydrogen or deuterium, v is an integer 0 or 1, each $R^3$ independently is hydrogen or a straight $C_{1-22}$ alkyl group with the proviso that at the most one $R^3$ is H, and X and M are as defined above.

Typically, a mesogenic, photochromic group may be two or more benzene rings linked together by azo groups, in particular in a 1,4-pattern, and optionally further substituted with other groups affecting the light-absorbtion properties of the entire group.

It is, however, preferred that the mesogenic, photochromic group M is a group of the general formula VI or VII

VI

VII in which each R" is hydrogen or deuterium, and $R^4$ is $-CN$, $-NO_2$, or $-OR^5$ where $R^5$ is straight $C_{1-10}$ alkyl or a group $-CH_2-{}^*CH(CH_3)-CH_2-CH_3$.

It is contemplated that when $R^5$ is $-CH_2-{}^*CH(CH_3)-CH_2-CH_3$, the presence of a chiral carbon atom will confer ferroelectric properties to the resulting polyester. As a result thereof, anisotropic phases in such a polyester may potentially be able to be erased through the application of an electric field across the polymer film. Such fields may be applied by sandwiching a film of the polyester between optically transparent, electrically conducting layers such as ITO (indiumtin-oxide).

Due to greater ease of preparation, in the various groups above where a symbol may signify hydrogen or deuterium, it is preferred that the symbols in question signify hydrogen. Thus, in the general formulas I, VI or VII, it is preferred that R is hydrogen, W, W' and W" is $CH_2$, q' is 0, and Y is not a group of the formula $Y^5$ or $Y^6$.

In one subclass S1 of the polyesters of the formula I, it has been found they undergo the localized transition to the anisotropic state through the unique and novel biphotonic process involving two visible wavelengths as described above. Generally speaking, such polymers are those where the dicarboxylic acid is aliphatic and has a chain length in the lower part of the range indicated above. Thus, one very interesting subclass of the polyesters of the formula I is that in which the number of carbon atoms in a group $Y^1$, $Y^2$, $Y^3$, $Y^4$, $Y^5$, and $Y^6$ in the carbon chain between the two carbonyl groups attached to the Y-groups is 4–8.

As it will also be seen from the examples below, such polymers have been found to be able to be converted into an optically anisotropic phase when irradiated with two beams of polarized, visible or near-ultraviolet light, conveniently laser light for the preparation of holograms. Typically, the wavelengths of the two beams are in the range of 350–515 nm and 600–700 nm, respectively.

In another interesting subclass S2 of the polymers it has been found that they are able to be converted into an optically anisotropic phase when irradiated with a single wavelength of polarized light. Typically, such polymers are those where the dicarboxylic acid is aliphatic and has a chain length in the high part of the range indicated above. Thus, another very interesting subclass og the polymers of the formula I is that in which the number of carbon atoms in a group $Y^1$, $Y^2$, $Y^3$, $Y^4$, $Y^5$, and $Y^6$ in the carbon chain between the two carbonyl groups attached to the Y-groups is 9–20, preferably 10–14, in particular 12. The anisotropic phase generated in such polymers has been found to exhibit a very long lifetime in that holographically prepared diffraction gratings have been stored for 17 months without any significant decrease in the diffraction efficiency.

In the polymers of the formula I, it has been found convenient and particularly preferred that the dicarboxylic acid part is an unbranched α, ω-alkyldicarboxylic acid, i.e. that Y is a group $Y^1$.

Specific examples of subclass S1 above are polymers in which

1) R is hydrogen; x is 0; Y is a group $Y^1$ where n is 4; X is hexamethylene; M is 4-(4-cyanophenylazo)phenoxy; and p has a mean value of around 30, (poly(2-[6-(4-(4-cyanophenylazo)-phenoxy)-hexyl]-1,3-propylene-adipate));

2) R is hydrogen; x is 0; Y is a group $Y^1$ where n is 5; X is hexamethylene; M is 4- (4-cyanophenylazo)phenoxy; and p has a mean value of around 85, poly(2-[6-(4-(4-cyanophenylazo)-phenoxy)-hexyl]-1,3-propylenepimelate);

3) R is hydrogen; x is 0; Y is a group $Y^1$ where n is 6; X is hexamethylene; M is 4-(4-cyanophenylazo)phenoxy; and p has a mean value of around 88, (poly(2-[6-(4-(4-cyanophenylazo)-phenoxy)-hexyl]-1,3-propylene-suberate)); and 4) R is hydrogen; x is 0; Y is a group $Y^1$ where n is 8; X is hexamethylene; M is 4-(4-cyanophenylazo)phenoxy; and p has a mean value of around 76, (poly(2-[6-(4-(4-cyanophenylazo)-phenoxy)-hexyl]-1,3-propylenesebacate)).

Specific examples of polymers of subclass S2 above are those in which

1) R is hydrogen; x is 0; Y is a group $Y^1$ where n is 12; X is hexamethylene; M is 4-(4-cyanophenylazo)phenoxy; and p has a mean value of around 96, (poly(2-[6-(4-(4-cyanophenylazo)-phenoxy)-hexyl]-1,3-propylenetetradecanedioate));

2) R is hydrogen; x is 0; Y is a group $Y^1$ where n is 12; X is hexamethylene; M is 4-)4-cyanophenylazo)phenoxy; and p has a mean value of around 140, (poly(2-[8-(4-(4-cyanophenylazo)-phenoxy)-octyl]-1,3-propylenetetradecanedioate));

3) R is hydrogen; x is 0; Y is a group $Y^1$ where n is 12; X is decamethylene; M is 4-(4-cyanophenylazo)phenoxy; and p has a mean value of around 104, (poly(2-[10-(4-(4-cyanophenylazo)-phenoxy)-decyl]-1,3-propylenetetradecanedioate)); and

4) R is hydrogen; x is 0; Y is a group $Y^1$ where n is 12; X is decamethylene; M is 4-(4-cyanophenylazo)-2,3,5,6-tetradeuterophenoxy; and p has a mean value of around 27, (poly(2-[10-(4-(4-cyanophenylazo)-2,3,5,6-tetradeuterophenoxy)-decyl]-1,3-propylenetetradecanedioate)).

The polyester compounds of the general formula I may in principle be prepared by any of the methods known in the art for the preparation of polyesters, i.e. reaction of the relevant diol with the relevant dicarboxylic acid or an activated derivative thereof, if necessary, in the presence of an appropriate catalyst. Due to the presence of the group —X—M and for the purpose of controlling the degree of polymerization within the desired limits, it is, however, preferred that the polyester compounds are prepared by a transesterification reaction where a diester of the dicarboxylic acid is reacted with the diol in the presence of an alkaline catalyst. Thus, the compounds of the formula I wherein x is 0 may be prepared by reacting a diester of the formula VIII

E—O—C(=O)—Y—C(=O)—O—E    VIII wherein Y is as defined above, and E is an alcohol residue moiety such as an alkyl or aryl group, with a diol of the formula IX

HO—C(R)$_2$—CH(X—M)—C(R)$_2$—OH    IX

Since it has been found to be advantageous with respect to obtaining a polyester compound with a suitably high degree of polymerization, a preferred example of E is phenyl.

A typical alkaline catalyst is $K_2CO_3$ which may be present in an amount corresponding to 5 mole %.

While the reaction may, in principle, be carried out in a solvent, a high reaction temperature during the polymerization has been found to be an important factor with respect to obtaining a high degree of polymerization, and it is therefore preferred to carry out the reaction without a solvent, i.e. in a melt, typically for a period of 3–4 hours. Since some of the reactants, in particular the diol IX, typically are sensitive to overheating and may undergo thermal decomposition (especially of the mesogenic group) at high temperatures such as above 190°–200° C., the polymerization is preferably carried out in the melt at temperatures between 120° C. and 170° C. for a total period of 3–4 hours. The progress of the condensation polymerization process may be monitored by e.g. monitoring the formation of any volatile hydrolysis products. Another way of monitoring the process is to periodically measure the melt viscosity of the product, which may at the same time reveal any occurrences of possible degradation reaction. Viscosity measurements for polyester characterization may typically be accomplished in the well-known manner through the use of a capillary viscosimeter on dilute polymer solutions, typically in tetrahydrofuran at 30° C. Values of inherent or reduced viscosity may be determined at various concentrations and extrapolated to zero concentration to get the intrinsic viscosity number expressed in units of deciliters per gram (dL/g). Size Characterization Chromatography (SEC) of the polyester is typically carried out in THF solutions. The peak molecular mass is calculated from the maximum position of the molecular mass distributions revealed by SEC, by use of calibration curves constructed from polystyrene standards with narrow molecular mass distributions.

In a typical process, the mixture of the phenyl diester and the diol including the catalyst is first heated to 120°–130° C. under $N_2$ at reduced pressure (1300 Pa or 10 mbar) during which partial mono-transesterification of the phenyl ester with the diol takes place. Thereafter, the temperature is raised to 170° C. and the pressure reduced further (60 Pa or 0.5 mbar) to effect the polycondensation as a chain growth process.

In order to have the best possible control of the development of the degree of polymerization, it is very important that the reactants are present in exactly stoichiometric amounts. An overriding requirement for ensuring this is the use of highly purified reactants.

Work-up of the resulting polyesters may be carried out by usual methods such as dissolution in and precipitation from a solvent or mixtures of solvents. A typical work-up procedure involves the dissolution of the polyester in an aromatic solvent such as benzene and precipitation in a lower alkanol such as methanol followed by filtration and removal of the solvents from the solids by evaporation.

With respect to the compounds of the formula I wherein x is different from 0, i.e. where ester units consisting of VII and IX are present in the chain in a random arrangement together with ester units II, III, IV, and/or V, such polyester compounds may be prepared by the same method as described above but using, apart from the diester VII and the diol IX, on the one hand a diester of the formula X or XI

E'—O—C(=O)—Y'—C(=O)—O—E'    X

E'—O—C(=O)—(CH$_2$)$_v$—Z'—(CH$_2$)$_v$—C(=O)—O—E'    XI wherein Y', Z' and v are as defined above, and E' is as defined for E above, and on the other hand a diol of the formula IX above or the formula XII $$HO—C(R')_2—C(R^3)_2—C(R)_2—OH \qquad XII$$

wherein $R^3$ and $R'$ are as defined above, as starting materials. As it will be apparent, the amounts of X, XI, and XII necessary are entirely dependent on the nature of A and the desired ratio between p-x and x in the general formula I and can be calculated therefrom.

The diesters of the formulas VIII, X and XI are either known compounds, or they may be prepared analogously with known compounds, cf. Hvilsted, S. et al., *Polymer*, 32, p 127–133 (1991).

The diols of the formula XII are either known compounds, or they may be prepared analagously with known compounds cf. for example Hvilsted, S. et al., *Polym. Bull.*, 26 (1991), p29; and Andruzzi, F. et al., *Polymer*, 32 (1991), p 2294–2299.

The diols of the formula IX may be prepared by a synthetic sequence as shown on Scheme 1 below. In the Scheme, a diol is prepared in which —X— is —$(CH_2)_n$—, R is H, and M is a group VI wherein R" is H and $R^4$ is —CN. However, it will be clear that other diols IX may be prepared according to the same synthetic strategy and using corresponding reagents and similar conditions.

In the preparation of the diethyl ω-bromoalkylmalonate 1, the dibromoalkane Br—$(CH_2)_n$—Br is generally used in an 50% excess at low temperature (at least 72 h at −5° C.) in order to avoid excessive alkylation (see also Salmon-Legagneur et al., *Bull Soc. Chim. Fr.*, 1956, pp 1345–1350, and 1957, pp 1463–1469).

The reduction of 1 to the 1,3-propandiol 2 with mixed hydrides is carried out as described by Nystrom, R. F., *J. Am. Chem. Soc.*, 81, pp 610–612 (1959). The formation of the dioxane compound 3 is typically carried out at reflux temperature with removal of the water formed.

The formation of the hydroxyphenylazo compound from phenol and the 4-substituted aminobenzene is carried out in the usual manner while maintaining the temperature at below 5° C.

The coupling of 3 with the hydroxyphenylazo compound to give 4 is typically carried out at reflux temperature. The final removal of the acetal function from 4 to give the diol 5 is typically carried out at reflux temperature using hydrogen chloride as the $H^+$ source.

The invention will now be described with reference to the figures, wherein.

SCHEME 1

The invention is further illustrated by the following non-limiting examples.

EXAMPLE 1

Experimental

Synthetic procedures

The starting material were generally of the purest kind available and used as received. The inorganic chemicals were all analytical grade. All solvents were analytical grade and used as received unless otherwise specified.

Preparation of necessary precursors leading to 2-[6-(4-(4-cyanophenylazo)-phenoxy)-hexyl]-1,3-propanediol Preparation of diethyl 6-bromohexylmalonate.

280 g of absolute ethanol (distilled from Na under $N_2$ flush) is added a 1 L three-necked round flask fitted with a $N_2$-inlet tube, a mechanical stirrer, and a reflux condenser under a $N_2$ blanket. 23.7 g (1.03 mol) of freshly cut Na is added quickly while the condenser is temporarily removed. The Na is allowed to react while stirring with a rapid hydrogen formation. When all Na has disappeared (1¼ hour) the solution of ethanolate is heated on a water bath to 65° C. and 256.4 g (1.60 mol) of diethyl malonate (Fluka, puriss. >99%) is added through the condenser neck. The formation of the malonate anion is allowed to proceed for 1 h at 65° C. The reaction flask is then cooled on an ice/water bath on 0° C. and 318 g (1.30 mol) of 1,6-dibromohexane (Fluka, pract. ~97%) is added in one portion and the reaction flask is transferred to a cooling bath at −5° C. while maintaining stirring. The last cooling procedure results in a yellow, almost mayonnaise-like mixture which is left mechanically stirring for 72 h while maintaining −5° C. under a $N_2$ blanket. During the later stages of the reaction period a white precipitate (NaBr) is observed in the reaction mixture. The reaction mixture is then allowed to raise to room temperature and stirring at this temperature continued for another 2 h. The reaction mixture is transferred of a 1 L flask and the ethanol is removed by rotary evaporation under reduced pressure (water aspirator) at initially a water bath temperature of 23°–24° C. and finally 40° C. 200 mL of distilled water is added the reaction mixture in order to dissolve the NaBr. The separation into two phases, oil and water, is facilitated by addition of 50 mL of diethyl ether. The organic phase is separated and the water phase further extracted with 50 mL of diethyl ether which is combined with the original organic phase and dried over anhydrous $Na_2SO_4$. After filtration into a 500 mL round flask the diethyl ether is removed by rotary evaporation and 482.7 g of crude product is obtained.

A size exclusion chromatographic (SEC) investigation of the crude product indicates 4 main components of which the two last eluding substances are identified as unreacted diethyl malonate and 1,6-dibromohexane, respectively. The crude product mixture is then subjected to fractionation by vacuum distillation on a 35 cm long Vigreux glass column. After the lower boiling unreacted starting materials, 174 g of diethyl 6-bromohexylmalonate (53.8% yield based on the amount of Na initially employed) with a boiling point (b.p.) of 120°–121° C./0.1 mbar [b.p. 164° C./3 mmHg, Salmon-Legagneur, F. and Neveu, C., *Bull. Soc. Chim. Fr.* 1956, 1345–50] is obtained. In addition, 51 g of a fraction with a boiling point 201°–205° C./0.15 mbar is isolated. The purity of diethyl 6-bromohexylmalonate is >99.9% as investigated by SEC and the structure is verified by $^{13}$C NMP spectroscopy allowing all the non-symmetrical carbons to be identified. In an analogous manner the pure, high boiling substance was identified as a tetraethyl ester in which a 1,6-hexamethylene moiety has reacted with a malonate anion in both ends.

Preparation of 2-(6-bromohexyl)-1,3-propanediol.

11.39 g (0.3 mol) of $LiAlH_4$ (Fluka, purum) was refluxed for 1 h in 400 mL of diethyl ether (Dried by distillation from $LiAlH_4$ under a $N_2$ blanket) while stirring under $N_2$ blanket in a 3-necked 2 L round flask equipped with a pressure equilibrating addition funnel, a mechanical stirrer, and a reflux condenser. After cooling, 40.00 g (0.3 mol) of aluminium chloride anhydrous (Fluka, puriss.) dissolved in 200 mL of dried diethyl ether was added drop by drop from the funnel to cause a slow reflux. When cold this reducing mixture was slowly (by drops) admitted 48.88 g (0.15 mol) of diethyl 6-bromohexylmalonate dissolved in 200 mL of dried diethyl ether from the funnel at a rate causing slow reflux. The addition typically takes 2 h and reflux was continued, normally 2 h after addition ended, by external heating. Excess of $LiAlH_4$ was cautiously destroyed by very slow and dropwise addition of 10 mL of water. 600 mL of 6N $H_2SO_4$ was then added in order to dissolve the metal salts after which the content of the reaction flask was transferred to a separating funnel and the ether phase and the acidic aqueous phase were separated. The latter phase was then repeatedly extracted with 6 portions of 100 mL diethyl ether. The combined ether phases were washed three times with 100 mL of distilled water to pH >5 and dried over anhydrous $Na_2SO_4$ for at least 2 h. The filtered ether solution was then subjected to rotary evaporation and 36.6 g of crude product is obtained. The crude 2-(6-bromohexyl)-1,3-propanediol always contained approximately 10–15% non-reduced starting material (as identified by SEC). However, the structure of 2-(6-bromohexyl)-1,3-propanediol was verified by FTIR and $^{13}$C NMR and the product could be used without further purification since vacuum distillation never resulted in isolation of pure 2-(6-bromohexyl)-1,3-propanediol due to a thermally induced oligomerization leading to a range of oligoethers.

Preparation of 2,2-dimethyl-5-(6-bromohexyl)-m-dioxane.

24.2 g of crude 2-(6-bromohexyl)-1,3-propanediol was dissolved in a mixture of 200 mL of benzene, 30 mL acetone, and 0.4 g toluene-4-sulfonic acid monohydrate (Fluka, puriss.) in a 1 L 1-necked round flask. While magnetically stirring and refluxing 1.4 mL of water was separated and collected in a Dean-Stark trap during 22 h. The solvents were removed by rotary evaporation under reduced pressure and the residue vacuum distilled to recover 14.65 g of 2,2-dimethyl-5-(6-bromohexyl)-m-dioxane with b.p. 96°–97° C./0.06 mbar.

Preparation of 2-(4-hydroxyphenylazo)-benzonitrile.

47.20 g (0.4 mol) of 4-aminobenzonitrile (Fluka, purum) was first dissolved in 400 mL of ethanol then 200 mL of 6N HCl was added causing immediately a precipitate. The ethanol was then carefully removed by rotary evaporation under reduced pressure (water aspirator) at maximum 35° C. After cooling to 0° C. 27.60 g (0.4 mol) of $NaNO_2$ dissolved in 50 mL of water was added during 20 min. constantly keeping the temperature below 5° C. The cold diazonium salt was coupled with 37.61 g (0.4 mol) of phenol (Merck, zur Analyse) in a solution of 48.0 g (1.2 mol) of NaOH in 400 mL of water by stirring 1 h without heating. The precipitate was washed with water, dissolved in 800 mL 50% aqueous ethanol then precipitated with 12N HCl. 4-(4-hydroxyphenylazo)-benzonitrile was recovered by filtration and air-dried in a 91% yield (81.2 g) with a melting point (m.p.) 201°–203.5° C. [m.p. 201°–203° C., Socha, I. Horská, J., and Vecera, M., Collect, Czech. Chem. Commun. 34, 2982–2990 (1969)].

Preparation of 2,2-dimethyl-5-[6-(4-(4-cyanophenylazo)-phenoxy)-hexyl]-m-dioxane.

Typically 11.18 g (0.04 mol) of 2,2-dimethyl-5-(6-bromohexyl)-m-dioxane, 8.93 g (0.04 mol) 4-(4-hydroxyphenylazo)benzonitrile, and 6.91 g (0.05 mol) of dried, powdered $K_2CO_3$ were mixed in 100 mL of dry acetone in a 250 mL 1-necked round flask fitted with a reflux condenser which was capped with a $CaCl_2$ drying tube and refluxed under mechanical stirring for 72 h. Most of the acetone was then evaporated and the residue added 100 mL of water in order to dissolve entirely the formed KBr and residual $K_2CO_3$. The precipitate was filtered and recrystallized twice from 50 mL of absolute ethanol affording 15.0 g (89% yield) of 2,2-dimethyl-5-[6-(4-(4-cyanophenylazo)phenoxy)hexyl]-m-dioxane with a m.p. 103° C.

Preparation of 2-[6-(4-(4-cyanophenylazo)-phenoxy)-hexyl]-1,3-propanediol.

6 g of 2,2-dimethyl-5-[6-(4-(4-cyanophenylazo)-phenoxy)-hexyl]-m-dioxane was added a mixture of 100 mL of 96% ethanol and 30 drops of 12 N HCl i 2 mL of water in a 250 mL 1-necked fitted with a reflux condenser and refluxed for ½ h under vigorous mechanical stirring. After cooling 2-[6-(4-(4-cyano-phenylazo)-phenoxy)-hexyl]-1,3-propanediol was recovered as precipitate and recrystallized twice from 25 mL of absolute ethanol resulting in 4.44 g (82% yield). Before polymerization 2-[6-(4-(4-cyanophenylazo)-phenoxy)-hexyl]-1,3-propanediol was additionally purified by sublimation.

The purified 2-[6-(4-(4-cyanophenylazo)-phenoxy)-hexyl]-1,3-propanediol resulted in the following elemental analysis:

$C_{22}H_{27}N_3O_3$(381.47) Calc. C 69.29% H 7.09% N 11.02% Found C 69.41% H 7.27% N 11.09%

Then three different spectroscopic techniques were used to characterize 2-[6-(4-(4-cyanophenylazo)-phenoxy)-hexyl]-1,3-propanediol.

An absorption spectrum of a 0.021 mg/mL solution of 2-[6-(4-(4-cyanophenylazo)-phenoxy)-hexyl]-1,3-propanediol in tetrahydrofuran showed a single almost symmetrical peak between 300 and 410 nm with a maximum ($\lambda_{max}$) at 364 nm and a broad shoulder towards the visible (410–510 nm) range. An extinction coefficient ($\epsilon_{max}$) of approx. 21,000 could be estimated.

Secondly, Fourier-Transform infrared spectroscopy was performed on solid 2-[6-(4-(4-cyanophenylazo)-phenoxy)-hexyl]-1,3-propanediol finely dispersed in a matrix of KBr.

Characteristic absorptions are the aromatic ring modes (1600/1580 $cm^{-1}$ and 1500 $cm^{-1}$), the aromatic out-of-plane vibration (850 $cm^{-1}$) and particularly the isolated $\nu(C\equiv N)$ vibration at 2230 $cm^{-1}$. The doublet observed in the spectrum at 1740 and 1455 $cm^{-1}$ can be assigned to the $\delta(CH_2)$ absorption bands of the methylene units in the aliphatic spacer chain. Finally a very broad band, 3200–3500 $cm^{-1}$, is due to the O—H stretching.

Finally $^{13}C$ NMR spectroscopy of 2-[6-(4-(4-cyanophenylazo)-phenoxy)-hexyl]-1,3-propanediol dissolved in $(CD_3)_2SO$ revealed the following carbon resonances (ppm):

| a | b | c | d | e | f | g | h | i |
|---|---|---|---|---|---|---|---|---|
| 118,32 | 112,42 | 133,46 | 122,74 | 154,12 | 146,02 | 125,12 | 115,04 | 162,35 |
| 6 | 5 | 4 | 3 | 2 | 1 | t | s | |
| 68,12 | 28,51 | 25,35 | 27,62 | 26,52 | 29,19 | 43,05 | 61,83 | |

The assignments illustrate that all non-symmetrical carbon atoms can be detected at positions which would normally be expected for a molecule containing such different functional groups in this particular combination.

Finally three different thermal analytical techniques were utilized in order to characterize 2-[6-(4-(4-cyanophenylazo)-phenoxy)-hexyl]-1,3-propanediol:

1. When examined during slow heating (3° C./min) under crossed polarizers in an optical microscope (POM) only a crystalline→isotropic melt transition at 152° C. was observed. On the other hand, observed during slow cooling (3° C./min) from the melt three thermal transitions were recognized by POM (with the following texture identification):139° C. (isotropic melt→nematic), 130° C. (nematic→smectic A) and 125° C. (smectic A→crystalline).

2. An investigation by differential scanning calorimetry (DSC) revealed a melting at around 152° C. at slow heating (3° C./min). By slow cooling (3° C./min) from the melt only a recrystallization at approx. 140° C. was observed, but not any of the other transitions observed by POM.

3. The thermal stability of 2-[6-(4-(4-cyanophenylazo)-phenoxy)-hexyl]-1,3-propanediol was investigated by thermogravimetric analysis in a helium atmosphere during a constant heating (1° C./min) from room temperature to 550° C. Under these conditions no weight loss could be detected at 200° C., whereas at 225° C., a weight loss of approx. 2% and at 250° C. a weight loss of approx. 5%, respectively were recorded. At 300° C. a weight loss of almost 50% was detected.

Instrumentation

Size exclusion chromatography (SEC)

SEC investigation of the reaction mixtures and fractions obtained after purification by both vacuum distillations and recrystallizations were performed with a Knauer HPLC-PUMO FR-30 fitted with a Rheodyne 7010 Sample Injection Valve, typically equipped with a 100 μL loop, and aa series of PLgel 5 μcolumns (7.5 mm i.d.) from Polymer Laboratories: 5 cm Guard, 30 cm 500 Å, and 2×60 cm 100 Å. In case of polyester analysis, a 5 cm 7000 Guard and a 60 cm GMH 6 mixed gel column from Toya Soda, Japan, were employed. Detection was accomplished with a Knauer High Temperature Differential-Refractometer. Concentrations of solutes were nominally 1% (w/v) or less (brominated and all azodye containing compounds have relatively high refractive indeces) in stabilized tetrahydrofuran (tech. grade) eluent at a nominal flow of 1 mL/min. verified by a syphon counter. Investigations were performed either at 30° C. in a thermostatically controlled oven or at ambient temperature.

$^{13}C$ nuclear magnetic resonance (NMR) spectroscopy $^{13}C$ NMR spectra were recorded at 62.896 MHz on a Bruker AC 250 spectrometer. The spectra were obtained in

5 mm i.d. tubes generally at 300K on 20% (w/v) solutions in CDCl$_3$ except the mesogenic diols which were dissolved in (CD$_3$)$_2$SO typically in 10% (w/v) concentrations and ran at 327K. The spectra were recorded with a pulse width of 3.5 µs (~60°), 0.92 s pulse acquisition, and a 2 s pulse repetition were used to obtain normally 2000 scans. Chemical shifts are referred to the central resonance of CDCl$_3$ (76.90 ppm from tetramethylsilane (TMS) or of (CD$_3$)$_2$SO (37.60 ppm from TMS), respectively.

Preparation of poly(2-[6-(4-(4-cyanophenylazo)-phenoxy)-hexyl]-1,3-propylenetetradecanedioate).

A mixture of 0.5333 g (1.398 mmol) of diphenyl tetradecanedioate and 0.5740 g (1.398 mmol) of 2-[6-(4-(4-cyanophenylazo)-phenoxy)-hexyl]-1,3-propanediol was weighed into an approx. 10 mL spherical glass reactor, melted in a N$_2$ atmosphere and homogenized by stirring achieved by rotating the reactor. After cooling to room temperature the mixture was added approx. 10 mg (approx. 5-mol % catalyst) K$_2$CO$_3$ and reheated to 120°–130° C. under N$_2$ and reduced pressure (1300 Pa or 10 mbar). In this transesterifcation step, hydroxypropylene ester and phenol was formed:

This step is intrinsically reversible, but the continuous removal of the volatile phenol product will under the adopted experimental conditions drive the reaction towards the right. In a second stage, the temperature was slowly raised to 170° C. and the vacuum lowered down to 60 Pa or 0.5 mbar in order to complete the ester exchange reaction and force the hydroxypropylene ester toward the polycondensation by alcoholysis, thus forming the polyester and liberating further phenol due to the chain growth process:

The choice of the final working temperature for the second stage was governed by the thermal stability of the azo group of the mesogenic units which starts to decompose at above 200° C. The viscosity of the reaction mixture increased markedly during the conversion. As a result of this, the conversion was monitored periodically by quantitatively determining the amount of phenol formed by disconnecting the reactor and weighing it. The resulting reaction time was about 4 hours.

The polyester was recovered from the reactor after cooling by dissolution in 10 mL of benzene. The polyester solution was centrifuged and precipitated in 100 mL of methanol. The precipitated polyester was collected by filtration, air-dried, redissolved in 10 mL of benzene, centrifuged and finally reprecipitated in 100 mL of methanol. After filtration the polyester was dried in a vacuum oven at room temperature for at least 16 h and 0.839 g (almost a 100% yield) was recovered.

The intrinsic viscosity [η] of the poly (2-[6-(4-(4-cyanophenylazo)-phenoxy)-hexyl]-1,3-propylenetetradecanedioate) prepared was carried out by measurements of solutions in tetrahydrofuran at 30° C. in a capillary vicosimeter and was found to be 0.73 dL/g. The peak molecular mass (M$_p$) as determined by SEC in tetrahydrofuran was found to be 58,000 daltons. The SEC characterization revealed molecular mass distributions typical for condensation polymerizations at high conversions.

EXAMPLE 2

In a manner similar to Example 1 and using the appropriate precursors, the following propanediol derivatives were prepared:

2-[8-(4-(4-cyanophenylazo)-phenoxy)-octyl]-1,3-propanediol;

2-[10-(4-(4-cyanophenylazo)-phenoxy)-decyl]-1,3-propanediol;

2-[10-(4-(4-cyanophenylazo)-2,3,5,6-tetradeutero-phenoxy)-decyl]-1,3-propanediol.

Using the appropriate starting materials, including the above propanediole derivatives, the following polyesters were prepared in a manner analogous to Example 1:

1) poly(2-[8-(4-(4-cyanophenylazo-phenoxy)-octyl]-1,3-propylenetetradecanedioate), [η]=1.01 dL/g, [M$_p$]=89,000 daltons;

2) poly(2-[10-(4-(4-cyanophenylazo)-phenoxy)-decyl]-1,3-propylenetetradecanedioate), [η]=0.94 dL/g, [M$_p$]=68,000 daltons;

3) poly(2-[10-(4-(4-cyanophenylazo)-2,3,5,6-tetradeuterophenoxy)-decyl]-1,3-propylenetetradecanedioate), [η]=0.16 dL/g, [M$_p$]=18,000 daltons;

4) poly(2-[6-(4-(4-cyanophenylazo)-phenoxy)-hexyl]-1,3-propyleneadipate), [η]=0.20 dL/g, [M$_p$]=15,000 daltons;

5) poly(2-[6-(4-(4-cyanophenylazo)-phenoxy)-hexyl]-1,3-propylenepimelate), [η]=0.45 dL/g, [M$_p$]=43,500 daltons;

6) poly(2-[6-(4-(4-cyanophenylazo)-phenoxy)-hexyl]-1,3-propylenesuberate), [η]=0.50 dL/g, [M$_p$]=46,000 daltons; and 7) poly(2-[6-(4-(4-cyanophenylazo)-phenoxy)-hexyl]-1,3-propylenesebacate), [η]=0.42 dL/g, [M$_p$]=42,000 daltons.

EXAMPLE 3

Figure 1:
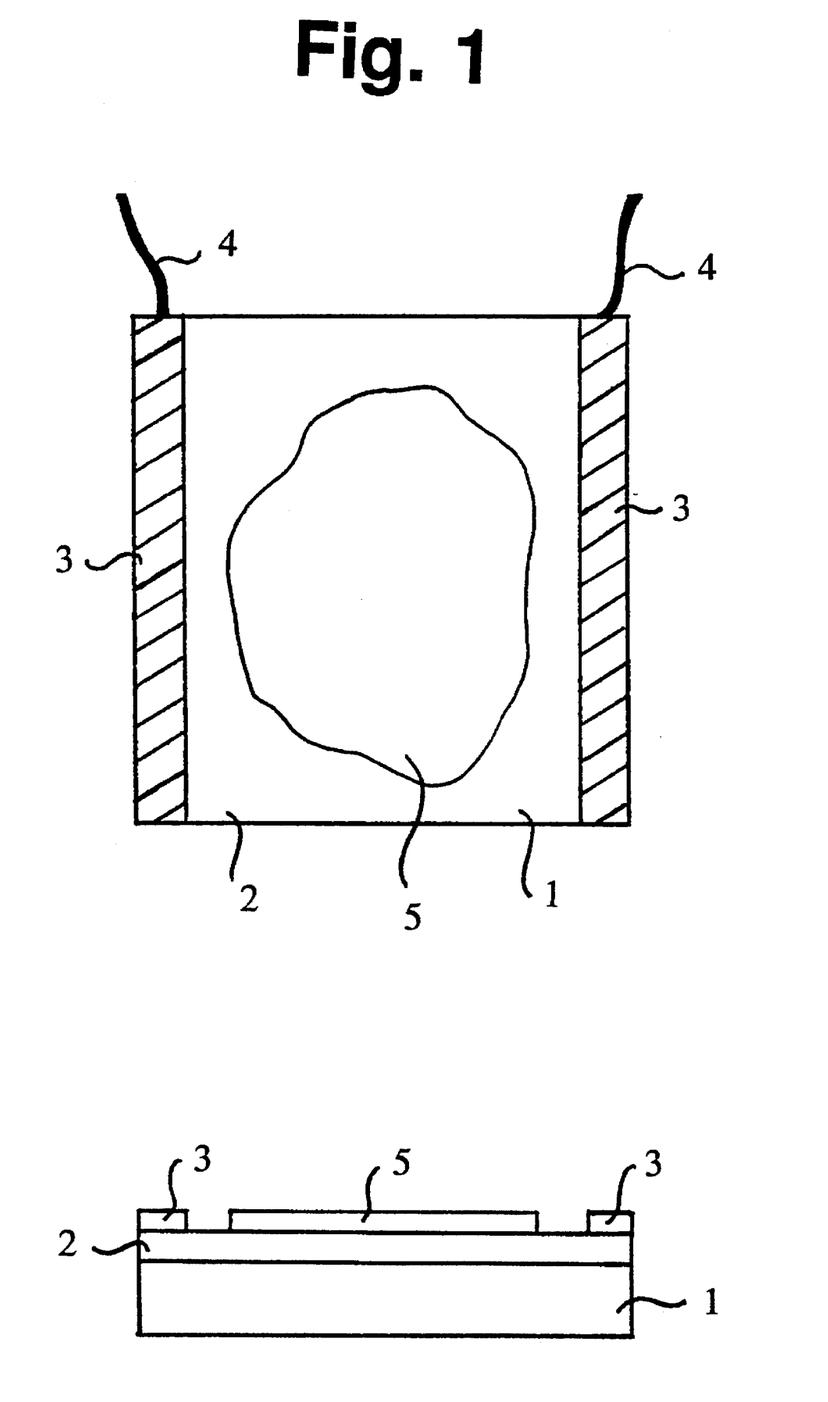
FIG. 1 shows a top- and side view of a polymer deposited on a substrate.

One-photon process 2 mg of poly(2-[6-(4-(4-cyanophenylazo)-phenoxy)-hexyl]-1,3-propylenetetradecanedioate) prepared as described in Example 1 above was dissolved in 200 µL chloroform and cast on a square-shaped optical glass substrate 1 having a thickness of 1 mm and a side length of about 5 cm. The glass substrate 1 was covered with a layer 2 of Indium Tin Oxide (ITO) which is an optically transparent electrical conductor, which is connected to electrical connectors 4 by electrodes 3. Before casting, the substrate 1 was thoroughly cleaned in a detergent solution, rinsed with distilled water, and dried. FIG. 1 illustrates the structure of the film 5 on the substrate 1.

Figure 2:
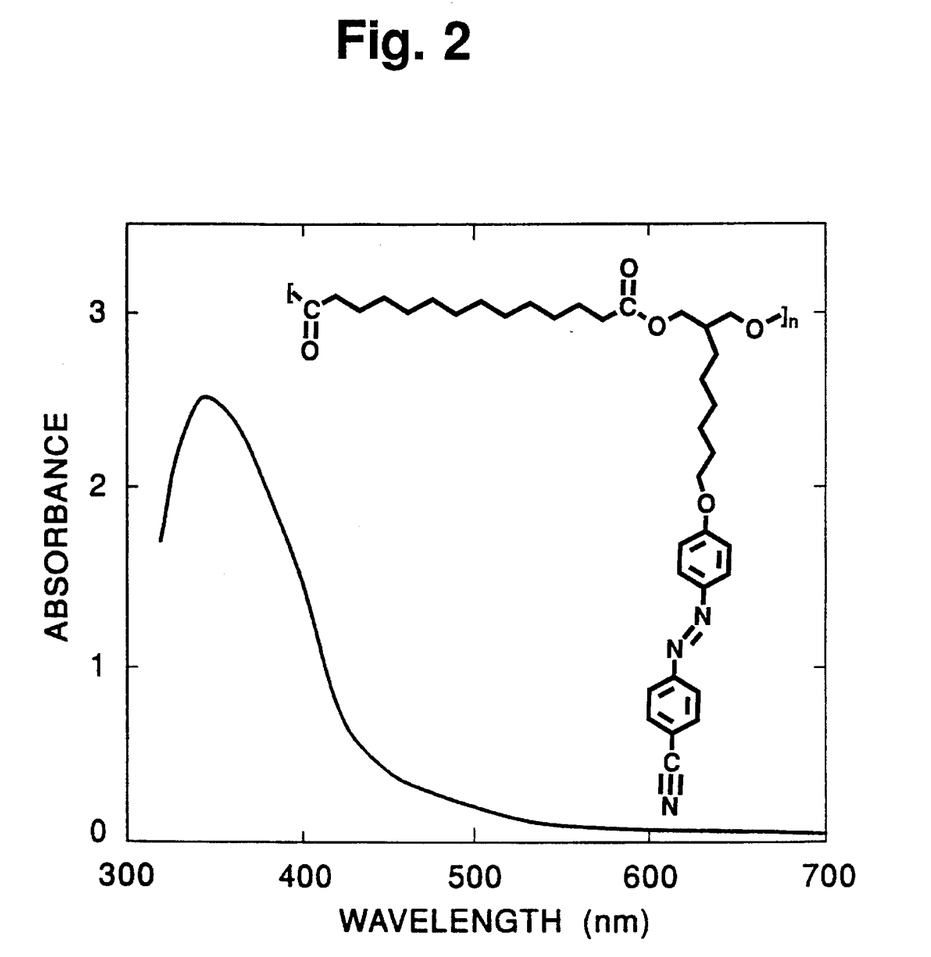
FIG. 2 shows the absorption spectrum of the film on the substrate.

When the solvent has evaporated, the transmission loss of the formed optical carrier is on the order of 50% at a wavelength of 633 nm for a film 5 thickness of about 5 μm. This loss includes the reflection loss from the substrate 1. The absorption spectrum of a 1 μm thick film 5 on a substrate 1 is shown in FIG. 2.

When examining the film 5 in a polarization microscope at room temperature and using weak white light, the film 5 exhibits no birefringence, and when performing conoscopic observations, no evidence of homeotropic alignment of the mesogenic groups is seen. Thus, the polyesters in the material are not pre-aligned either mechanically or electrically.

Figure 3:
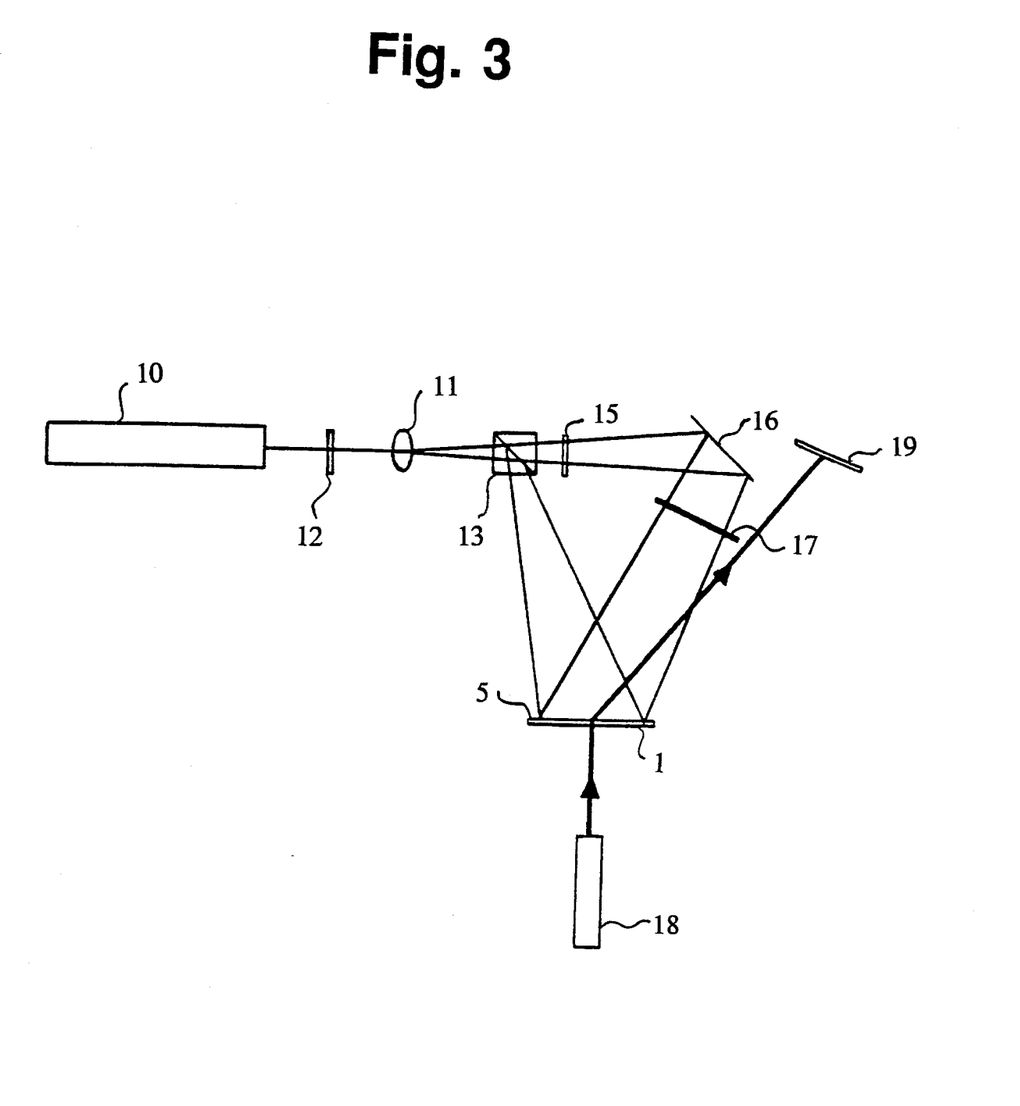
FIG. 3 shows a typical setup for fabricating two-beam polarization holography.

In FIG. 3 a setup for performing conventional two-beam polarization holography is seen. A laser 10, in this case an Argon-ion laser (Spectra-Physics, Model 2020) using the 488 nm line, is directed through a a half-wave plate 12, to rotate the linearly polarized light emitted by the laser 10, a lens 11 and further on to a polarizing beam-splitter 13 splitting beam into two beams of the same intensity. One of these beams is directed to the film 5 carried by the substrate 1. The second beam is transmitted through a second half-wave plate 15 and is directed, by means of a mirror 16, through an object 17, which defines the final hologram, and further on to the film 5.

In this way, the two beams create a grating on the film 5 whereby a hologram, which is characteristic for the object 17, is formed in the optically sensitive film 5. If the object 17 is removed, two coherent, linearly polarized beams overlap on the film 5, whereby an ordinary grating is formed. The polarization of the beams can either be parallel or orthogonal to each other. The intensity of the laser light emitted by the laser 10 and overlapping on the film 5 is about 500 mJ/cm$^2$.

Due to the illumination of the film 5, the illuminated area of the film 5 becomes birefringent—a state which remains even after the illumination is stopped. Thus, the illuminated areas of the film 5 exhibit different optical behaviour than the rest of the film 5, which is still not birefringent.

The formation of the hologram may be monitored by directing a second beam of polarized light on the film 5. This light may be emitted from a laser 18, such as a He-Ne laser, and directed through the film 5 from the opposite side than that illuminated by the laser 10. The formation of the grating in the film 5 may be monitored e.g. on a screen 19 or by monitoring the intensity of light from the laser 18 diffracted in the first order of the grating.

The life time of the information stored in this way is in the order of years. A grating manufactured as described above shows no signs of degradation after a period of 17 months.

As described earlier, the hologram in the film 5 may be erased e.g. by heating the film 5. This may be performed locally by illuminating the film 5 with a higher intensity than when storing a pattern, such as 1 W/cm$^2$ for e.g. 30 s, or globally by transmitting a current through connectors 4, electrodes 3 and, thus, the ITO 2 so as to raise the temperature of the film 5 to about 60° C. The stored information may also be erased if illuminated with circularly polarized light or light with a direction of polarization different from the light storing the information.

EXAMPLE 4

Bi-photon process

A film 5 on a substrate 1 was formed as in Example 3, but now with poly(2-[6-(4-(4-cyanophenylazo)-phenoxy)-hexyl]-1,3-propyleneadipate), prepared as described in Example 2 above, and the substrate 1 was positioned in the setup described in Example 3.

When illuminating this film 5 with the laser light from the Argon-ion laser 10 alone, a hologram is not readily formed. However, when the red laser 18 (He-Ne laser) is shone on the film 5, the hologram is formed by a bi-photon process, and the formation of e.g. a grating as in Example 3 may be seen by monitoring the first order diffraction of the light emitted by the laser 18.

As the light from the laser 10 will typically illuminate the whole of the surface of the film 5, the light from the second laser 18 will perform a "gating", wherein the hologram is only fixed in the small area illuminated by the second laser 18. Thus, as the spot illuminated by the second laser 18 may be quite small, a large number of holograms may be stored in the same film 5 at the same time. The position and the size of these holograms are defined purely by the overlay position by the two lasers 10 and 18; the position and the size of the spot of the second laser 18 on the film 5.

Figure 5A:
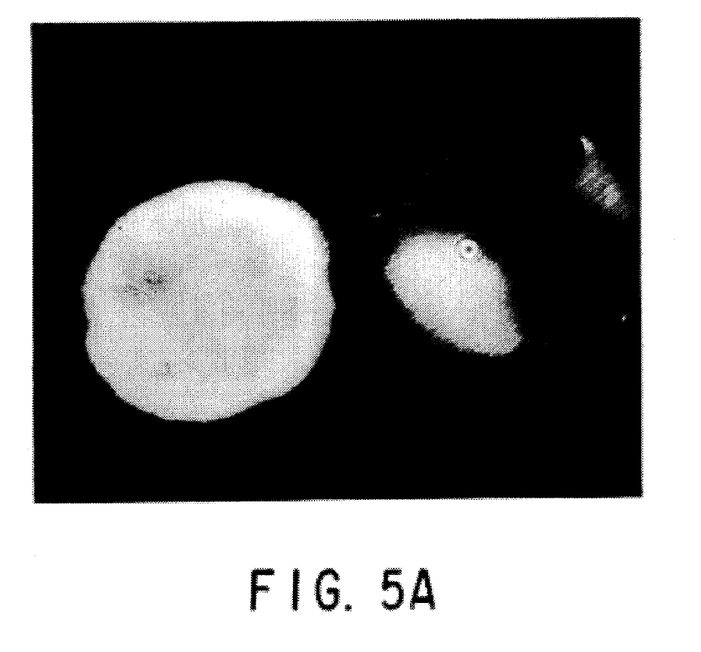
FIGS. 5A and 5B show a hologram formed by the two-beam technique.
Figure 5B:
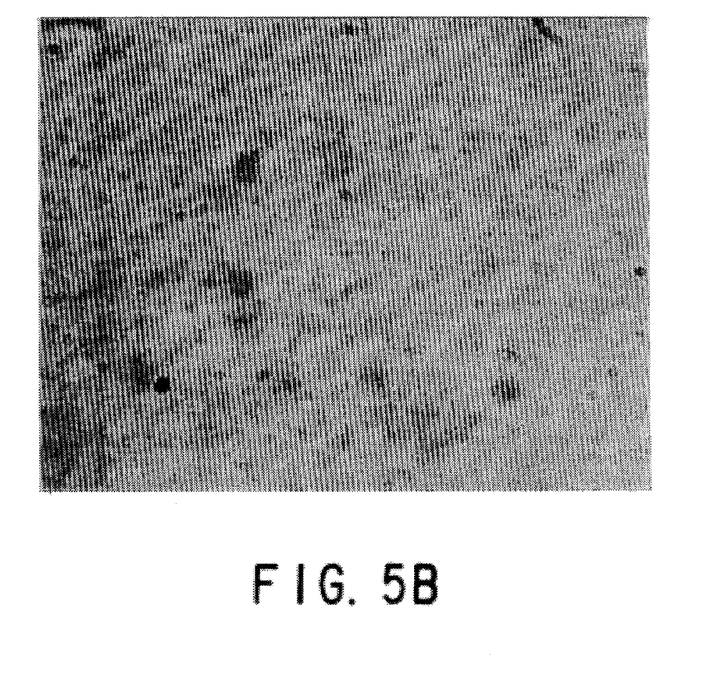

This may be seen from FIGS. 5a and 5b, wherein FIG. 5a shows a film 5, having been irradiated with the two beams, positioned between two crossed polarizers so that only light having observed a shift in polarization in the birefringent illuminated part of the film 5 is seen in the picture; two spots are seen. These spots are generated by illuminating the film 5 with the laser 10 and defining the position and the size of the spots with the laser 18; fixing the hologram in these spots. The size of the spots in this film 5 is about 1 mm. Thus, all the information contained in the hologram is stored in the spot defined by the spot of the laser 18. This means that a number of different holograms may easily be stored in a single polymer film.

In FIG. 5b the fringes from the two interfering light beams from the laser 10 are seen. In this film 5, a grating having 1300 line pairs/mm has been manufactured.

Without being limited to any theory, it is contemplated that the state in which the chromophores in the film 5 is put due to illumination with the light from the laser 10 is an intermediate state. In this state, the film 5 is more transparent than when not having been illuminated. The film 5 returns to the normal transparency after a period of about four days. It is contemplated that the chromophores are put in a cis-state, where the chromophores are isotropically distributed in the plane of the film 5, and where the dipole moments of the chromophores may interact with the laser 18. The chromophores will decay relatively fast from the cis-state to the original trans-state if not illuminated by the laser 18. Thus, if the film 5 is not illuminated with the laser 18 within about 60 minutes after illumination with the laser 10, no hologram will be formed as the chromophores have decayed to the trans-state. In this case, the dipole moments may have any direction in the plane. However, if the chromophores are illuminated with the laser 18, the dipole moments may interact with the light giving a rotation of the chromophores; when decaying to the trans-state, the dipole moments of the chromophores will be directed at a certain angle to the polarisation of the light from the laser 18; a hologram is formed in the film 5.

The transitions of the chromophores between the cis-state and the trans-state are electronic transitions and are therefore quite fast—at least compared to the transitions characterized in the rotation of the chromophores; After illumination with the laser 10 for 5 seconds and with the laser 18 for the first 15 minutes, the chromophores in the film 5 will be under transition due to movement (rotation) of the chromophore: the rotation of the chromophore influences the position and rotation of the main chain of the polyester.

To illustrate the formation of a grating as a function of time, two experiments have been performed, wherein the first order diffraction of the laser 18 is measured while illuminating the film 5 with this laser to "fix" the grating:

a) the laser 10 illuminates the film 5 for the first 5 seconds and the laser 18 illuminates the film 5 continuously for a number of minutes, and b) the laser 10 illuminates the film 5 for the first 5 seconds and the laser 18 illuminates the film 5 for the first 20 seconds and again 5 minutes after.

Figure 4:
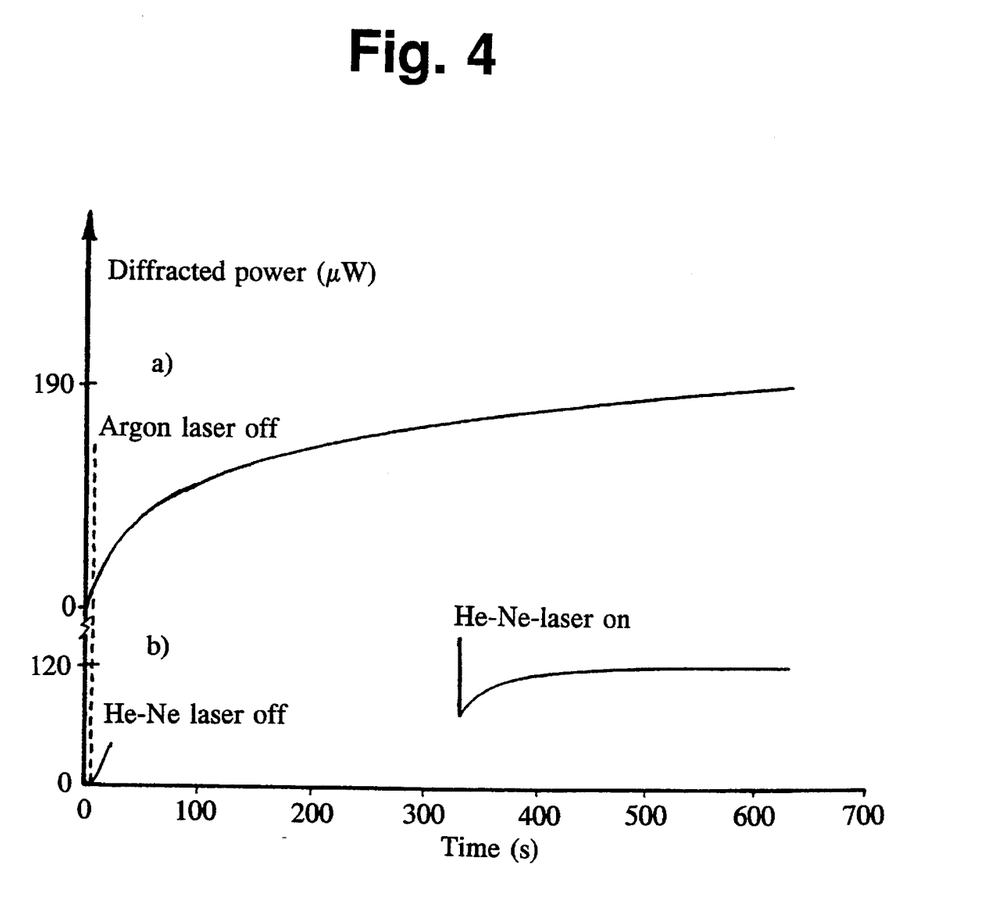
FIG. 4 shows the forming of a hologram.

The results of these experiments may be seen from FIG. 4. In these experiments, the laser 18 was a He-Ne laser emitting light at 633 nm with an intensity of 3 mW in a 3 mm spot giving an intensity of about 40 mW/cm$^2$.

From these experiments it is seen, that when the red laser (the laser 18) illuminates the grating continuously, the first order diffraction increases at least for the first 10 minutes, and that a high first order diffraction of the grating may be obtained: in FIG. 4, a diffraction of 200 µW (6–7% of the incoming beam) is seen. In fact, gratings having a first order diffraction of up to 15% have been fabricated.

Furthermore, it is seen that in experiment b), where the red laser (laser 18) does not continuously illuminate the film 5, an increase in the diffraction occurs even when the red laser does not illuminate the film 5. A large increase in the diffraction is further seen when the red laser is turned on after a period of 5 minutes. However, it is also seen that the obtained first order diffraction quickly converges (at about 120 µW), and that it is lower (in this experiment only about 3%) than that of experiment a).

Thus, it is seen that the obtainable strength of the grating increases with the illumination time of the laser 18. Furthermore, it is seen that a well functioning grating can only be formed when constantly illuminating the film 5 with the laser 18.

We claim:

1. A macroscopically isotropic side chain liquid crystal polymer containing photochromic mesogenic groups and which through irradiation with light is permanently or substantially permanently converted into an optically anisotropic phase without having been pre-oriented.

2. A polymer according to claim 1 which contains photochromic mesogenic groups having a dipole moment either in the ground state and/or in the excited state, in which the polymer is illuminated with polarized light, and wherein the conversion into the optically anisotropic phase comprises rotation of the axis of the dipoles away from the isotropic distribution of the directions of the dipoles towards a state in which the axis of the dipoles are substantially aligned at a certain angle to the polarization of the irradiating light.

3. A polymer according to claim 1, in which the photochromic mesogenic groups are present in a concentration corresponding to an absorbance between 0.001 and 10 at the wavelength of the light used to irradiate the polymer.

4. A polymer according to claim 3, wherein the photochromic mesogenic groups are present in a concentration corresponding to an absorbance between 0.01 and 5 at the wavelength of the light used to irradiate the polymer.

5. A polymer according to claim 4, wherein the photochromic mesogenic groups are present in a concentration corresponding to an absorbance between 0.01 and 3 at the wavelength of the light used to irradiate the polymer.

6. A polymer according to claim 5, wherein the photochromic mesogenic groups are present in a concentration corresponding to an absorbance between 0.5 and 2 at the wavelength of the light used to irradiate the polymer.

7. A polymer according to claim 6, wherein the photochromic mesogenic groups are present in a concentration corresponding to an absorbance of about 1 at the wavelength of the light used to irradiate the polymer.

8. A polymer according to claim 1, which is a polyester.

9. A polymer according to claim 1, which is permanently or substantially permanently converted into an optically anisotropic phase by irradiation with light of a single wavelength in the range of 100–1600 nm.

10. A polymer according to claim 9, in which the irradiation is performed with light at 300–700 nm with an energy between 1 mJ/cm$^2$ and 10 J/cm$^2$ for a period of time of less than 1000 seconds.

11. A polymer according to claim 10, in which the irradiation is performed with light at 300–550 nm with an energy between 50 mJ/cm$^2$ and 1 J/cm$^2$ for a period of time of less than 50 seconds.

12. A polymer according to claim 11, in which the irradiation is performed with light at 350–515 nm as emitted by an Argon-ion laser with an energy of about 100 mJ/cm$^2$ for a period of time of less than 10 seconds.

13. A polymer according to claim 9, in which the wavelength is in the range of 300–700 nm.

14. A polymer according to claim 13, in which the wavelength is in the range of 330–515 nm.

15. A polymer according to claim 14, in which the wavelength is 350–515 nm as emitted by an Argon-ion laser.

16. A polymer according to claim 9, wherein the light is applied to the polymer at an energy between 1 mJ/cm$^2$ and 10 J/cm$^2$ when the polymer is in the form of a film of a thickness in a range between 0.5 and 1000 µm.

17. A polymer according to claim 16, wherein the light is applied to the polymer at an energy between 50 mJ/cm$^2$ and 1 J/cm$^2$ when the polymer is in the form of a film of a thickness in a range between 0.5 and 100 µm.

18. A polymer according to claim 17, wherein the light is applied to the polymer at an energy of between 100 mJ/cm$^2$ and 800 mJ/cm$^2$ when the polymer is in the form of a film of a thickness in a range between 1 and 10 µm.

19. A polymer according to claim 18, wherein the light is applied to the polymer at an energy of about 500 mJ/cm$^2$ when the polymer is in the form of a film with a thickness of about 5 µm.

20. A polymer according to claim 1, which is permanently or substantially permanently converted into an optically anisotropic phase by first irradiating the polymer with polarized light of a first wavelength in the range of 100–1600 nm and simultaneously or subsequently irradiating the polymer with polarized light of a second wavelength in the range of 100–1600 nm.

21. A polymer according to claim 20, wherein the first wavelength is in the range of 300–700 nm, the second wavelength is in the range of 400–800 nm, the light of the first wavelength illuminates the polymer for between 0.01 and 1000 seconds with an intensity of between 1 mJ/cm$^2$ and 10 J/cm$^2$, and wherein the light of the second wavelength illuminates the polymer for between 0.01 seconds and 100 hours with an intensity of between 1 mJ/cm$^2$ and 10 J/cm$^2$.

22. A polymer according to claim 21, wherein the first wavelength is in the range of 450–515 nm, the second wavelength is in the range of 600–700 nm, the light of the first wavelength illuminates the polymer for between 0.1 and 100 seconds with an intensity of between 50 mJ/cm$^2$ and 1 J/cm$^2$, and wherein the light of the second wavelength illuminates the polymer for between 0.1 and 1000 seconds with an intensity of between 50 mJ/cm$^2$ and 1 J/cm$^2$.

23. A polymer according to claim 20, wherein the polymer is irradiated with a second wavelength different from the first wavelength.

24. A polymer according to claim 22, wherein the first wavelength is about 488 nm or 514 nm as emitted from an Argon-ion laser, and wherein the second wavelength is about 633 nm as emitted by a Helium-Neon laser or 670 nm as emitted by a diode laser, and wherein the intensities of the light of the first and second wavelengths are about 100 mJ/cm$^2$.

25. A polymer according to claim 1, in which the anisotropic phase is characterized by a change in refractive index.

26. A polymer according to claim 25, wherein the change in refractive index is in excess of 0.1% of the refractive index of the polymer in the isotropic state.

27. A polymer according to claim 26, wherein the change in refractive index is in excess of 0.5% of the refractive index of the polymer in the isotropic state.

28. A polymer according to claim 27 wherein the change in refractive index is in excess of 1% of the refractive index of the polymer in the isotropic state.

29. A polymer according to claim 28, wherein the change in refractive index is in excess of 5% of the refractive index of the polymer in the isotropic state.

30. A polymer according to claim 29, wherein the change in refractive index is in excess of 10% of the refractive index of the polymer in the isotropic state.

31. A polymer according to claim 30, wherein the change in refractive index is in excess of 30% of the refractive index of the polymer in the isotropic state.

32. A polymer according to claim 1, which is re-converted to its isotropic phase by being heated to a temperature of at least 60° C. and subsequent cooling to ambient temperature.

33. A polymer according to claim 1, which is erased by being irradiated with incoherent light, light having a different polarization than that of the light carrying out the conversion of the isotropic phase to the anisotropic phase, or circularly polarized light.

34. A polymer according to claim 1, which stores information at a density (expressed in lines per unit of length) of up to 5000 lines per mm.

35. A polymer according to claim 34, which stores information at a density (expressed in lines per unit of length) of up to 6000 lines per mm.

36. A polymer according to claim 1, wherein the irradiation is performed with linearly or circularly polarized light.

37. A polymer according to claim 36, wherein the irradiation is performed with linearly polarized light.

38. A polymer according to claim 1, wherein the irradiation is performed with monochromatic light.

39. A polymer according to claim 38, wherein the irradiation is performed with coherent light.

40. A polymer according to claim 1, wherein the irradiation is performed with laser light.

41. A polymer according to claim 12, in which the irradiation time is less than 1 second.

42. A polymer according to claim 12, in which the irradiation time is less than 0.5 seconds.

43. A polymer according to any one of claims 12, 41 and 42, wherein said irradiation is performed with light at 488 or 514 nm.

* * * * *

UNITED STATES PATENT AND TRADEMARK OFFICE
CERTIFICATE OF CORRECTION

PATENT NO. : 5,496,670
DATED : March 5, 1996
INVENTOR(S) : Hvilsted et al.

It is certified that error appears in the above-indentified patent and that said Letters Patent is hereby corrected as shown below:

Col. 21 —
In the Claims, Claim 5, line 3 change

"0.01" to --0.1--.

Signed and Sealed this

Thirtieth Day of July, 1996

Attest:

BRUCE LEHMAN

Attesting Officer         Commissioner of Patents and Trademarks